United States Patent [19]
Hill

[11] 3,927,390
[45] Dec. 16, 1975

[54] VEHICLE WARNING SYSTEMS
[75] Inventor: William Frank Hill, Stafford, England
[73] Assignee: The Lucas Electrical Company Limited, Birmingham, England
[22] Filed: Jan. 24, 1974
[21] Appl. No.: 436,114

[30] Foreign Application Priority Data
  Feb. 2, 1973   United Kingdom............... 5306/73

[52] U.S. Cl. ................................ 340/60; 340/52 F
[51] Int. Cl.² ............................................ G08B 19/00
[58] Field of Search ............. 340/52 F, 59, 60, 240, 340/244 R

[56]           References Cited
           UNITED STATES PATENTS
2,671,893   3/1954   Van Scoy et al. ................ 340/60 X
2,994,073   7/1961   Pelovitz ............................ 340/52 F
3,196,389   7/1965   Heidner ................................ 340/60

Primary Examiner—Alvin H. Waring
Attorney, Agent, or Firm—Olson, Trexler, Wolters, Bushnell & Fosse, Ltd.

[57]           ABSTRACT

A vehicle warning system has a warning device such as a lamp which is energised when the engine is running and the oil pressure falls below a threshold value. If the oil level falls below another predetermined value when the engine is stationary, the same warning device is operated.

11 Claims, 2 Drawing Figures

VEHICLE WARNING SYSTEMS

This invention relates to vehicle warning systems and has as its object the provision of such a system in a convenient form.

The invention resides in a vehicle warning system comprising a single warning device, means responsive to engine oil pressure for energising said warning device when the engine is running and the oil pressure falls below a threshold value, and means responsive to engine oil lever for energising said warning device when the engine is stationary and the engine oil level falls below a predetermined value.

Preferably, said means responsive to engine oil pressure is in the form of a switch which opens when the engine oil pressure achieves a threshold value and which together with said warning device is connected in series with an electronic switch which is arranged to be turned on in use when the switch closes and when the engine is running, current to turn on the electronic switch being supplied in use from a network responsive to an engine running condition, such as a contact breaker operable to cause ignition of the engine.

Preferably, said means responsive to engine oil level comprises switch means operable in response to the oil level falling below said threshold value to supply current to turn on said electronic switch, the arrangement being such that when the engine is stationary the normally open switch will be closed so that when said switch means operates to supply current to turn on said electronic switch, said warning device will be energised. The switch means could be a switch, or an electronic circuit responsive to oil level.

Conveniently, said warning device is in the form of a lamp or buzzer.

Figure 1:
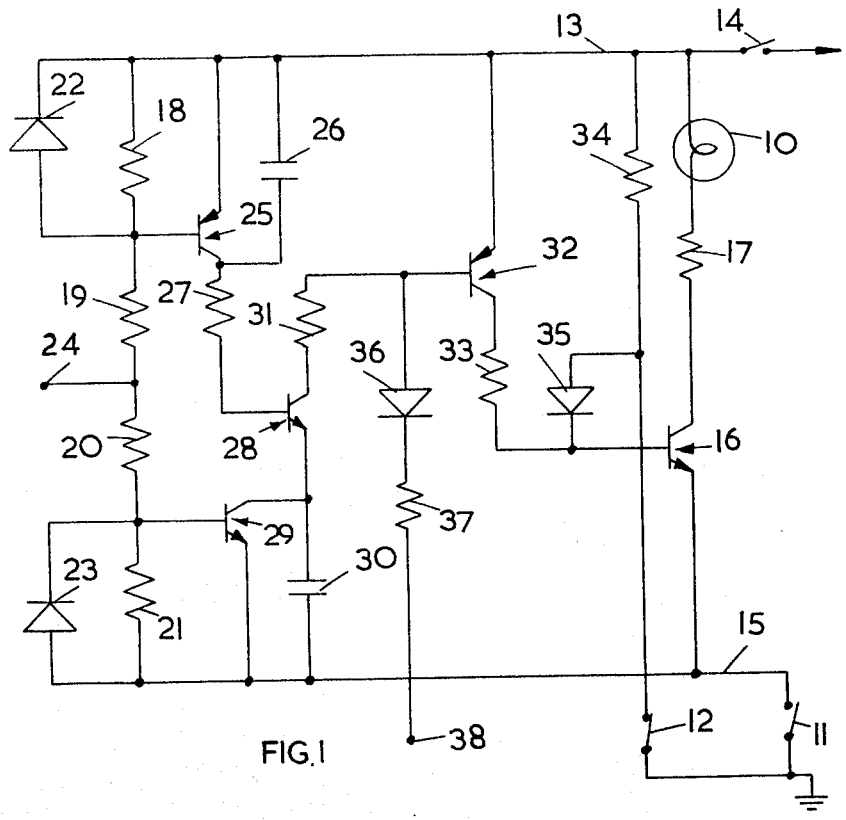
Figure 2:
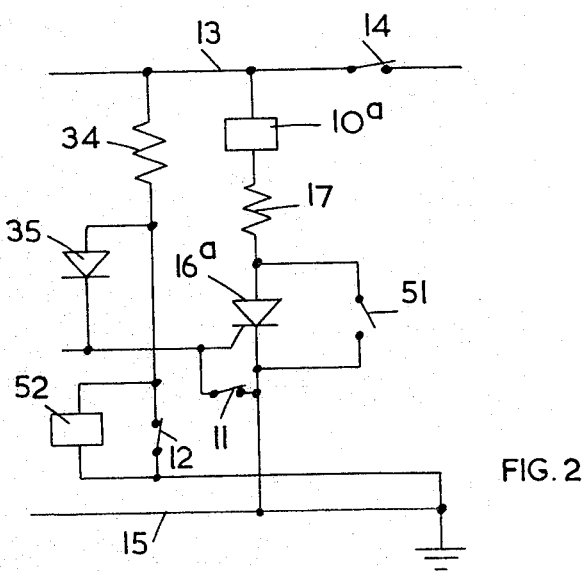

The invention will now be more particularly described with reference to the accompanying drawings, in which FIG. 1 is a circuit diagram of one embodiment of a vehicle warning system in accordance with the invention, and FIG. 2 illustrates a number of modifications of FIG. 1.

Referring to FIG. 1, the vehicle warning system shown therein comprises a warning device in the form of a lamp 10, a switch 11 which opens when the engine oil pressure achieves a threshold value, and which closes when the oil pressure falls below a threshold value, and a normally closed switch 12 which is responsive to engine oil level and which opens when the engine oil level falls below a predetermined value.

A supply line 13 is connected to the vehicle battery through the ignition switch 14 and a further line 15 is connected to earth through the switch 11. A n-p-n transistor 16 has its emitter connected to the line 15, and its collector connected through a series circuit comprising a resistor 17 and the warning lamp 10 to the line 13.

A resistor chain including four series connected resistors 18, 19, 20 and 21 is connected between the lines 13 and 15, the resistor 18 being bridged by a diode 22 the cathode of which is connected to the line 13, and the resistor 21 being bridged by a diode 23 the anode of which is connected to the line 15. The junction of resistors 19 and 20 is connected to a terminal 24 of a contact breaker operable to cause ignition of the engine. Thus, when the engine is stationary, the terminal 24 will either be at approximately earth potential, or at approximately full supply voltage, as long as the vehicle ignition switch is closed.

The junction of the resistors 18 and 19 is also connected to the base of the p-n-p transistor 25 the emitter of which is connected to the line 13 and the cathode of which is connected on the one hand through a capacitor 26 to the line 13 and on the other hand through a resistor 27 to the base of an n-p-n transistor 28. The junction of the resistors 20 and 21 is also connected to the base of an n-p-n transistor 29 the emitter of which is connected to a line 15 and the collector of which is connected to the emitter of the transistor 28, and to a capacitor 30 through the line 15. The collector of the transistor 28 is connected through a resistor 31 to the base of a p-n-p transistor 32, the emitter of which is connected to the line 13, and the collector of which is connected through a resistor 33 to the base of the transistor 16.

A resistor 34 and the switch 12 are connected in series between the line 13 and earth, and the junction of the resistor 34 and the switch 12 is connected to the anode of a diode 35 the cathode of which is connected to the base of the transistor 16.

Finally, the base of the transistor 32 is also connected to the anode of a diode 36 the cathode of which is connected through a resistor 37 to a terminal 38.

In operation, and assuming first of all that the engine is stationary, the ignition switch 14 is closed. As aforesaid, the terminal 24 will either be at approximately earth potential or at approximately full supply voltage, in which case one of the transistors 25 and 29 will be non-conducting, thereby preventing transistor 28 from conducting and in turn from causing transistors 32 and 16 from conducting. Now whilst the engine is stationary the normally open switch 11 will be closed because the oil pressure pump will not be operative, and thus if the switch 12 opens thereby signalling low oil level within the engine, the transistor 16 will conduct since base current will be supplied through the resistor 34 and the diode 35. Conduction of the transistor 16 will render the warning lamp 10 energised.

When the engine is running, the switch 11 will be open unless the engine oil pressure falls below the threshold value. The transistor 16 cannot conduct unless the switch 11 closes. Now when the engine is running, the potential at terminal 24 will step continuously in response to movement of the ignition contact breaker between approximately earth potential and full supply voltage causing intermittent conduction of both transistors 25 and 29. This results in a low collector-to-emitter potential difference of the transistors 25 and 29, by virtue of the respective capacitors 26 and 30, each of which is discharged rapidly be periods of conduction in its associated transistor and is only slowly re-charged through transistor 28. Accordingly transistor 28 remains turned on continuously whilst the engine is running, enabling transistors 32 and 16 to be turned on in consequence. In the event of an external lead to terminal 24 becoming disconnected, then both transistors 25 and 29 conduct continuously irrespective of whether the engine is running or not and this enables transistor 28 to conduct, so that the circuit will operate as if the engine were running. Thus, if the engine is running and the switch 11 closes the warning lamp 10 will be energised through the resistor 17, the transistor 16 and the switch 11.

Moreover, when the ignition switch 14 is closed a signal can be applied to the terminal 38 by an automatic timer, to cause the transistors 32 and 16 to conduct so as to verify that the lamp 10 is operable and it also checks for continuity of the branch including switch 11 and the lead connecting switch 11 to the emitter of the transistor 16.

Referring now to FIG. 2, there are shown a number of modifications of the arrangement shown in FIG. 1, and although these modifications are shown in a single drawing for convenience, it is to be understood that they can be used independently of each other. Firstly, the lamp 10 of FIG. 1 is replaced by a buzzer 10a. Secondly, the transistor 16 is replaced by a thyristor 16a. This has the effect that when a fault condition is sensed by virtue of gate current being supplied to the thyristor 16a, the winding device 10a will remain energised even if the fault disappears, because the thyristor 16a will continue to conduct. A normally open switch 51 is connected across the anode-cathode of the thyristor 16a, and momentary closing of the switch 51 will turn the thyristor 16a off. A further modification is that the normally open switch 11 is replaced by a normally closed switch connected between the gate and cathode of the thyristor 16a, or in the case of FIG. 1 between the base and emitter of the transistor 16. When the switch 11 is closed, it prevents conduction of the thyristor 16a on receipt of a gate signal, and so the operation is unaffected. Finally, in FIG. 2 an electronic switch 52 is shown connected across the switch 12. The switch 52 is driven so as to be closed when the engine temperature is high, so inhibiting oil level response when the engine temperature is high.

In the arrangements described, disconnection of a lead from the terminal 24 causes the circuit to behave as if the engine is running. In a modification, the arrangement includes a diode pump or other circuit for detecting whether the engine is running or not, so that if the engine is not running, the circuit does not operate. In such an arrangement, it is preferred that two leads should be connected to the terminal 24, one from the coil and one from the contact breaker, so that the only connection from the coil to the contact breaker is by way of the terminal 24. If now a lead to the terminal 24 becomes detached, it will be impossible to start the vehicle without replacing the lead.

I claim:

1. A vehicle warning system comprising a single warning device, means responsive to engine oil pressure for energizing said warning device only when said engine is running and the oil pressure falls below a threshold value, said means comprising a switch which opens when the engine oil pressure achieves a threshold value and which together with said warning device is connected in series with an electronic switch which is arranged to be turned on in use when the switch closes and when the engine is running, current to turn on the electronic switch being supplied in use from a network responsive to an engine running condition, and means responsive to engine oil level for energizing said warning device only when the engine is stationary and the engine oil level falls below a predetermined value.

2. A system as claimed in claim 1 in which said network is responsive to operation of the contact breaker of the engine.

3. A system as claimed in claim 1 in which said means responsive to engine oil level comprises switch means operable in response to the oil level falling below said threshold value to supply current to turn on said electronic switch, the arrangement being such that when the engine is stationary the normally open switch will be closed so that when said switch means operates to supply current to turn on said electronic switch, said warning device will be energised.

4. A system as claimed in claim 3 in which the switch means is a switch.

5. A system as claimed in claim 3 in which the switch means is an electronic circuit responsive to oil level.

6. A system as claimed in claim 5 in which the electronic switch is a transistor.

7. A system as claimed in claim 5 in which the electronic switch is a thyristor.

8. A system as claimed in claim 7 including a normally open switch connected across the anode-cathode of the thyristor.

9. A system as claimed in claim 1 in which the warning device is a lamp.

10. A system as claimed in claim 1 in which the warning device is a buzzer.

11. A system as claimed in claim 1 including means for inhibiting operation of the warning system of the engine temperature above a predetermined level.

* * * * *